United States Patent
Kornylak

[11] 3,914,084
[45] Oct. 21, 1975

[54] CONTINUOUS MOLDING MACHINE

[75] Inventor: Andrew T. Kornylak, Hamilton, Ohio

[73] Assignee: Kornylak Corporation, Hamilton, Ohio

[22] Filed: Nov. 6, 1973

[21] Appl. No.: 413,358

[52] U.S. Cl. .............. 425/329; 198/195; 425/224; 425/371; 425/817 C
[51] Int. Cl.² .......................................... B29D 7/14
[58] Field of Search ........ 425/4 C, 817 C, 115, 224, 425/116, 329, 335, 363, 371, 372, 447, 449, 471; 198/195; 264/47, 54; 164/86, 87, 279

[56] References Cited
UNITED STATES PATENTS

| | | | |
|---|---|---|---|
| 2,751,647 | 6/1956 | Brownstein | 164/279 X |
| 2,975,470 | 5/1961 | Snelson et al. | 425/151 |
| 3,078,505 | 2/1963 | Mitten | 425/817 C X |
| 3,082,861 | 3/1963 | Kornylak | 198/195 |
| 3,281,894 | 11/1966 | Buff et al. | 425/329 X |
| 3,312,760 | 4/1967 | Berner | 425/329 X |
| 3,795,269 | 3/1974 | Leconte et al. | 164/87 X |

*Primary Examiner*—Robert D. Baldwin
*Assistant Examiner*—Mark Rosenbaum
*Attorney, Agent, or Firm*—Thomas E. Beall, Jr.

[57] ABSTRACT

Rigid foam or cellular synthetic resin moldings having three dimensional configuration are continuously formed by a molding machine having a movable pressure tunnel defined by two or more, preferably three, endless resilient belts and endless rigid backup conveyors. The resilient belts in their relaxed condition will conform to the three dimensional configuration of the molding to be produced and are resiliently deformable when traveling around corners between their molding runs and return runs. At least one or more of the rigid backup conveyors is constructed of a plurality of metal plates hingedly connected together along adjacent edges to form an endless chain, and a corresponding plurality of shaped blocks formed from material extruded to substantially the width of the plates and cut to substantially the length of the plates to be rigidly or integrally secured respectively to the outer surface of the plates. Each of the blocks has a generally continuous outer surface generally continuously supporting the surface of the adjacent molding belt within the molding zone, which belt surface is opposite to its molding surface. For rigidity, a plurality of ribs extend between the outer support surface of the blocks and their respective plates. The hinges connecting the plates together may have lost motion transverse to the conveying direction to provide, with guide means, shifting of the plates to clamp the belts tightly together where they overlap on their sides within the molding zone.

5 Claims, 6 Drawing Figures

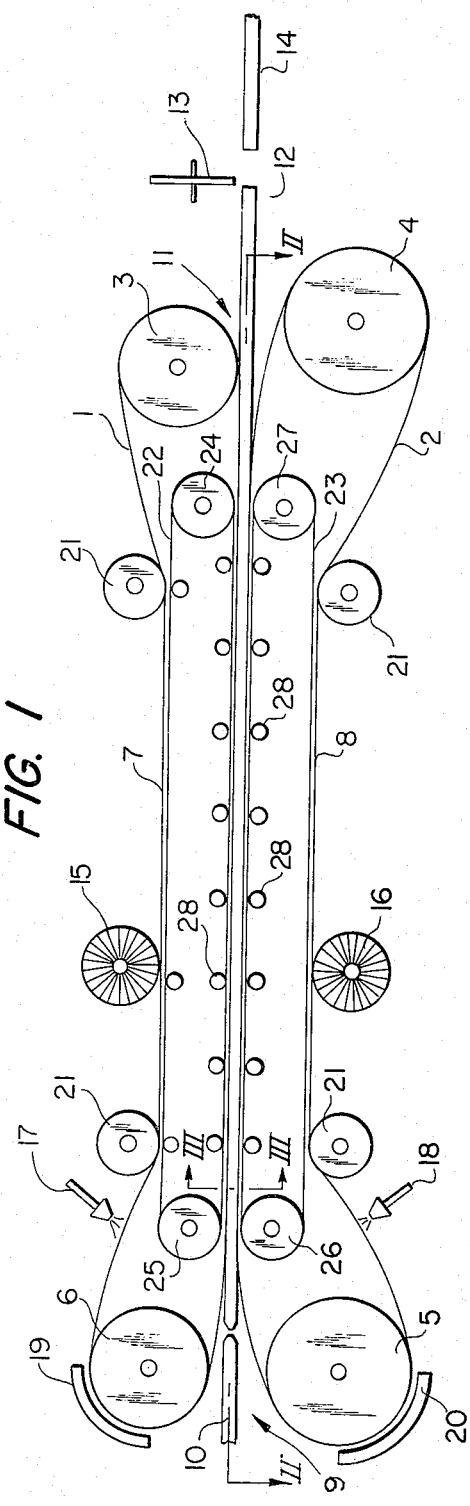
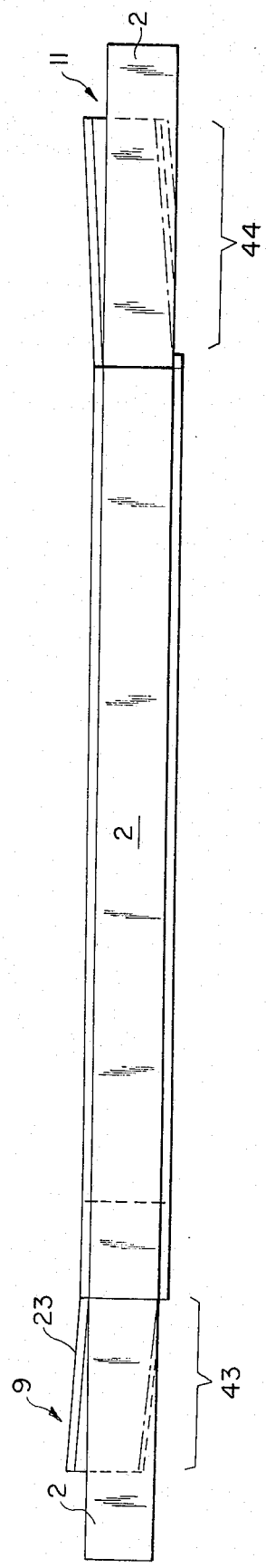

CONTINUOUS MOLDING MACHINE

BACKGROUND OF THE INVENTION

It is known to provide opposed configured resilient belts backed up by correspondingly configured rigid conveyors for the continuous molding of three dimensional material as shown in the Mitten U.S. Pat. No. 3,078,505, issued 1963.

There is a need for greatly three dimensional configured moldings in industry, preferably to be constructed of rigid cellular material or rigid cellular foam. The batchwise molding of such material is not economical when compared with the continuous molding of foam planar sheet material. However, there are considerable difficulties encountered when the continuous molding of such configured strips are contemplated.

SUMMARY OF THE INVENTION

The present invention employs highly three dimensionally configured resilient molding belts traveling in endless paths having common molding runs to form therebetween a molding zone within which synthetic resin may be foamed and cured to continuously produce the rigid cellular product. However, foaming pressures encountered are generally 5 p.s.i. or greater with respect to rigid cellular material. Such pressures place a considerable strain on the molding surfaces. The molding belts of the present invention are sufficiently thin to be easily resiliently bent toward a planar configuration, without permanent deformation, when traveling around roller guides or the like at the ends of the generally straight molding run to form the endless path. The backup belts that have outer surfaces generally corresponding and mating with the outer surfaces of the mold belts are formed by cutting off appropriate lengths of indefinite length extruded metallic material, which is quite economical. Thus, the blocks are all of identical cross sectional configuration throughout their length for each rigid conveyor, and may include integral ribs extending between their support surface and conveyor plates.

Each of the backup blocks is integrally connected to a metal conveyor plate of substantially the same width and length, which plates are hingedly connected together at their adjacent edges to form an endless chain.

With highly three dimensionally configured molding belts, there may be abutting surfaces between adjacent belts that extend generally perpendicular to the direction of travel of the respective belts, so that movement of the belts toward and/or away from each other within their plane of travel will not materially effect the clamping pressure at the adjacent abutting surfaces, which abutting surfaces will readily permit the high pressure foaming material to escape within the molding zone; the present invention further contemplates that the hinges connecting adjacent plates together have limited lost motion transverse to the direction of conveyor travel in combination with the guide means for shifting successive rigid conveyor plates, for at least one of the rigid conveyors closely adjacent the entrance of the molding tunnel or zone so that these abutting surfaces of adjacent belts may be tightly clamped together in the direction perpendicular to their surfaces to prevent leakage. The guide means will shift the plates successively in the opposite direction at the molding zone exit to unclamp the belts and permit them to be easily moved away from each other for releasing the cured product.

BRIEF DESCRIPTION OF THE DRAWING

Further objects, features and advantages of the present invention will become more clear from the following detailed description of a preferred embodiment of the present invention, as shown in the attached drawing, wherein:

FIG. 1 shows a somewhat schematic elevation view of the entire molding apparatus according to the present invention;

FIG. 2 is a simplified top view of the molding apparatus of FIG. 1;

DETAILED DESCRIPTION OF THE DRAWING

Figure 3:
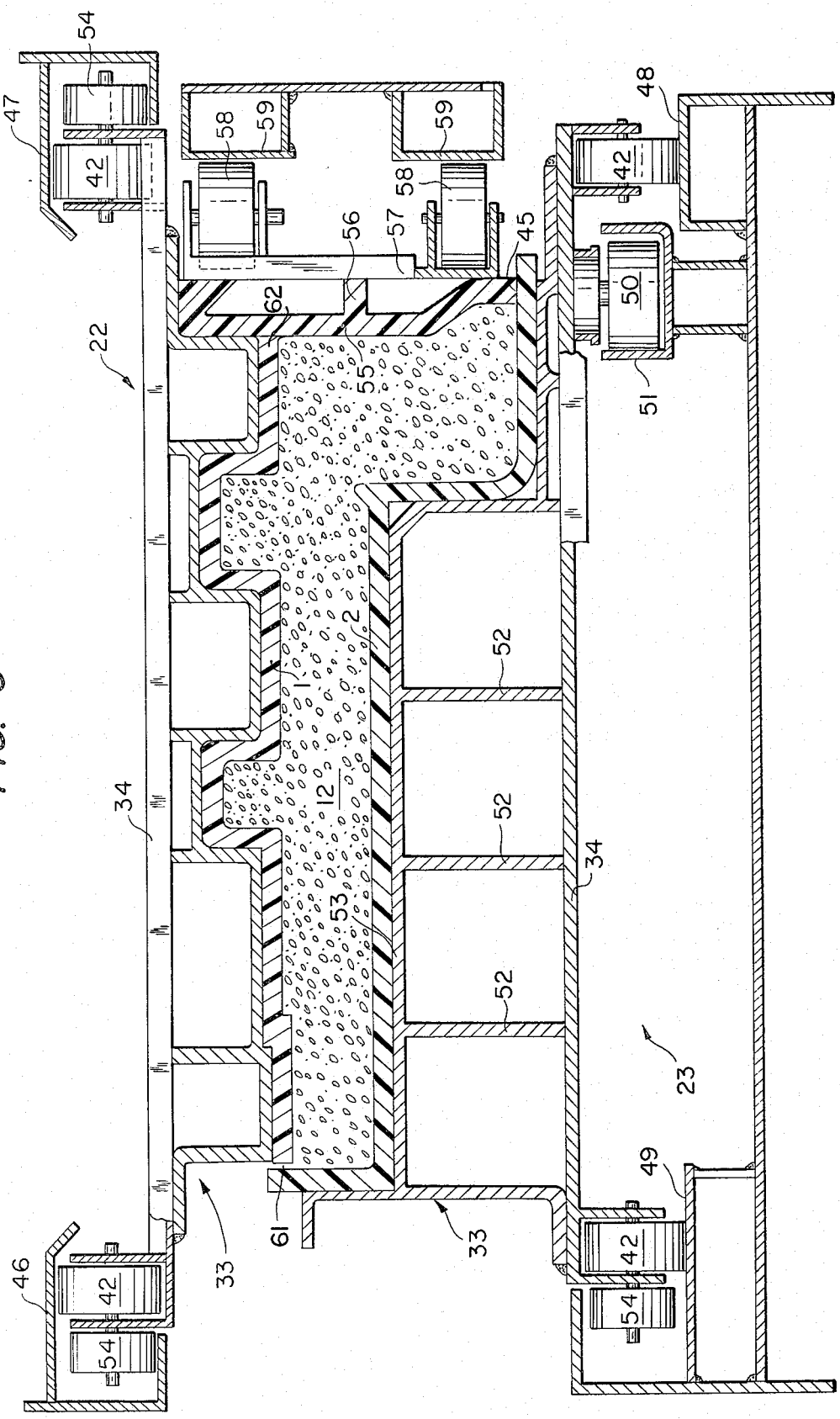
FIG. 3 is an enlarged detailed cross sectional view taken on line III—III of FIG. 1.

As shown in FIG. 1, an upper belt 1 and a lower belt 2, each travel in endless paths which paths are shown in the plane of FIG. 1 and include closely adjacent substantially rectilinear molding runs where they form between them a molding tunnel, transitional curved runs respectively around the guide pulleys 3, 4, 5, 6, and return runs 7, 8. Each of the belts is preferably constructed of a highly elastomeric material, such as rubber or neoprene.

At the entrance 9 to the above-mentioned molding zone or tunnel, with the upper belt 1 traveling in a counterclockwise direction and the lower belt 2 traveling in a clockwise direction, there is provided a nozzle 10 for injecting foamable synthetic resin between the belts. The foam may be expanded and cured in any known manner between the molding runs of the belts 1 and 2, so that at the exit end 11 of the molding tunnel, the foam 12 will be in the cellular form of an indefinite length, which may be cut by a suitable saw or the like 13 into individual pieces 14 for storage or shipping.

During the return run of the belts 1 and 2, brushes or the like 15, 16 will clean the belt surfaces of any adhered release agent or foaming material. At the transitional curved portion around the guide pulleys 5 and 6, the molding surface of the belt will be treated with a release agent, coloring agent, skinning agent or the like that may be applied by spray nozzles 17, 18, and thereafter the thus applied material is dried or cured by means of heating means 19, 20.

During the return runs of the belts 1 and 2, they are guided by means of idler pulleys 21; it is understood that some or all of the wheels or pulleys 3, 4, 5, 6 are driven preferably, or the belts may be driven by their frictional contact with each other and the backup conveyors to be described below.

Within the molding zone, the belts 1 and 2 are rigidly backed up by means of rigid endless conveyors 22, 23, each of which comprises an endless chain of serially pivotally connected metal plates that are guided around opposed sprockets or wheels 24, 25, 26, 27 and further backed up by means of idler wheels 28 in the molding zone. This rigid endless conveyor may be of the type disclosed in the U.S. Pat. No. 3,082,861, of Mar. 26, 1963, Kornylak et al.

Figure 4:
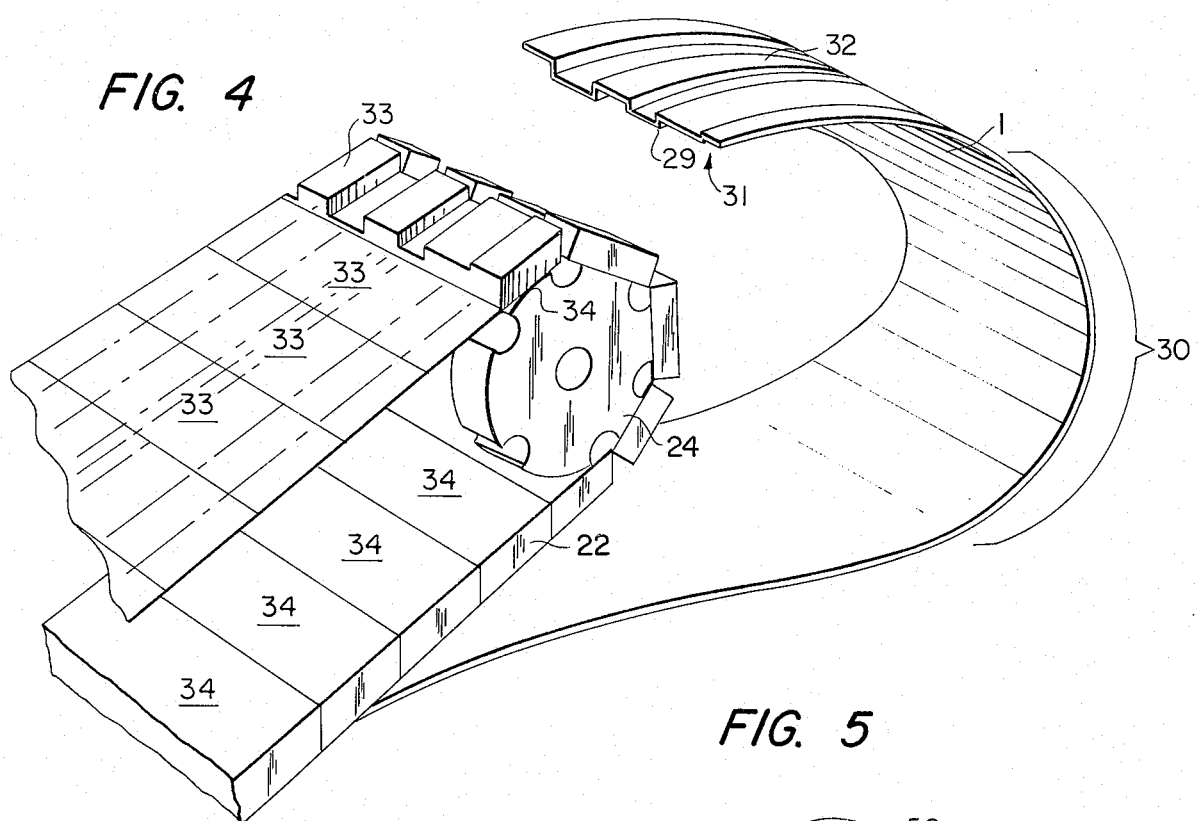
FIG. 4 is a perspective view, with portions broken away and removed, of one end of a resilient endless belt and rigid backup conveyor combination shown at the top in FIG. 3.

In the somewhat simplified partial perspective view of FIG. 4, it is seen that the belt 1 is three dimensionally configured in its cross section 29 that is transverse to its length, which cross section is uniformly maintained throughout the entire length of the endless belt 1. This three dimensional configuration is the relaxed configuration of the belt 1, and with the belt 1 preferably of thin uniform thickness, it will resiliently deform toward a planar configuration as it is bent throughout its transitional curved portion shown at 30. Such high degree of resiliency is desirable in reducing the diameter of this curved portion 30, reducing the power requirements of the apparatus, and in increased belt life. However, the resilient belt 1 is unable to resist the relatively high molding pressures of the expanding foam synthetic resin without the molding zone, which are usually 5 p.s.i. or higher. To resist such pressures and to maintain the cross sectional three dimensional configuration 29 throughout the molding zone, the backup surface 31, is engaged by means of a rigid block 33 that has the identical three dimensional cross sectional configuration as the belt at 29. As mentioned previously, the rigid endless conveyor 22 is made up of a plurality of serially and hingedly interconnected rigid metal plates 34. The blocks 33 correspond in number to the number of plates 34 and are respectively rigidly secured thereto. The blocks 33 are of substantially the same length, as measured in the direction of the conveyor and of substantially the same transverse width as their associated plates 34. Preferably, all of the blocks 33 are identical and all of the plates 34 are identical. The corresponding structure for the belt 2 and rigid endless conveyor 22 would be substantially identical to that described above with respect to FIG. 4.

A portion, in perspective, of either the belt 22 or 23 is shown in FIG. 2. As shown, the plates 34, at their adjacent edges, are provided with bent flanges 35 that are engaged with a C-shaped coupling member 36, to form a hinged connection between adjacent plates. Longitudinally extending brace plates 37, 38 on one side of the plate 34 and 39, 40 on the other side of the plate 34 are used to mount guide rollers 41, 42, whose function will be described later. Also, the inner brace plates 38, 39 will prevent longitudinal withdrawal of the coupling member 36 from the flanges 35, and the curvature of the endless conveyor around the pulleys 24, 25, 26, 27 will be great enough so that the coupling member 36 may not be withdrawn transversely. As shown, there is considerable spacing between the opposite ends of the coupling member 36 and the adjacent inner brace plates 38, 39, so that one plate 34 may shift in the axial direction of the coupling member 36 with respect to the adjacent plate 34 due to this lost motion, which direction will be transverse to the running direction of the conveyor.

Figure 5:
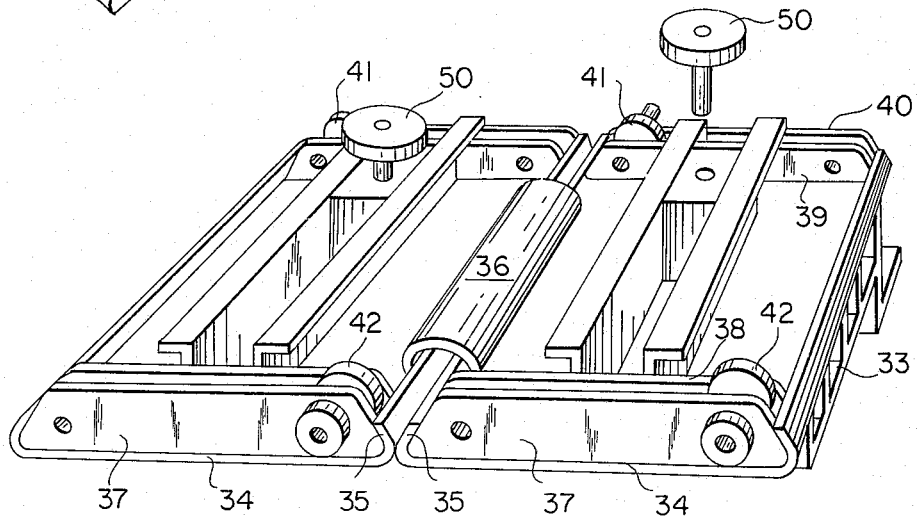
FIG. 5 is a partial perspective view of the rigid endless conveyor construction.

As shown in FIG. 2, schematically with respect to only one flexible belt and one backup endless conveyor, on an enlarged scale with respect to FIG. 1 in plan view, the rigid endless conveyor 23 may be shifted transversely within the area 43 due to the lost motion of coupling 36 previously described with respect to FIG. 5 and shifted transversely in the opposite direction within the area 44 at the exit end 11 of the molding tunnel. The purpose of this shift will be described in more detail with respect to FIG. 3 in the following description.

As shown in FIG. 3, the flexible belt 2 has an abutting engagement at 61 with the adjacent belt 1, which engagement is in a direction parallel with the plates 34 and transverse to the direction of belt running at one end, and at the other end of the belt 2, there is a sliding or wiping engagement with the adjacent belt at 45. The rollers 42 that are mounted on the respective plates 34 of the rigid backup conveyor will engage stationary tracks 46, 47, 48, 49 to hold the plates 34 at the proper spacing throughout the molding zone as shown in FIG. 3 and exert a clamping force perpendicular to the engaging surfaces at 45, however, they cannot exert any clamping force perpendicular to the engaging surfaces at 61 and the tolerances of such a working apparatus would be such that the expanding resin would leak at 61 under its high molding pressures unless some other clamping means were provided. As shown in FIG. 5, the lower rigid backup conveyor is provided with rollers 50 that are rotatably mounted on each of the plates 34, so that in the molding zone they will engage within stationary guide channels 51. These guide channels 51 are configured so that they will produce, by engagement with the associated rollers 50, the lateral shifting previously mentioned and shown in FIG. 2 within the zone 43 at the entrance end 9 of the molding zone, which lateral or transverse shifting will move the lower flexible belt 2 transversely to the right as shown in FIG. 3 to exert a clamping force at 61 perpendicular to the engaging belt surfaces to prevent leakage and further to produce a wiping sliding action at 45 that will help to clean and seal such surfaces. At the exit end 11 of the molding zone, the stationary guide channel and cooperating rollers 50 will produce a reverse shifting of the lower endless backup conveyor within the shifting zone 44 to unclamp the engaging surfaces at 61. With the three dimensional configuration of the belt 2 and the block 33 rigidly carried by the plate 34 and their frictional engagement, it is seen that any transverse shifting of the rigid backup conveyor plates 34 will corresspondingly shift the flexible belt 2.

As previously mentioned, each of the blocks 33 has substantially the same width and length as the associated conveyor plate 34, so that within the molding zone where the conveyor plates are rectilinearly aligned, the blocks 33 will present a substantially continuous backup surface engaging substantially the entire lower surface 31 of the respective belt 2 or 1. Each of these blocks 33 is identical for any one backup conveyor. Preferably, the blocks are formed from an indefinite extruded length of metal, for example aluminum, by cutting them into the appropriate lengths corresponding to the length of the plates 34 in the conveying direction. These blocks 33 have ribs 52 that integrally extend the entire length of the block and from the upper belt engaging surface 53 to a position where they engage the plate 34 for purposes of reinforcement.

During the return runs of the rigid backup conveyors, the rollers 54 that are preferably mounted on the same axis as the rollers 42 will engage suitable tracks or the like to support the rather heavy conveyors.

Although only two backup conveyors and two flexible belts may be employed, it is preferable to employ a third three dimensionally configured backup belt 55 that is highly resilient and flexible. The belt 55 will travel in an endless path (not shown) and lie in a plane generally perpendicular to the plane of FIG. 1, that is perpendicular to the common plate of the belts 1, 2 and backup conveyors 22, 23. The three dimensional configuration of the belt 55, being not quite as severe as the molding belt, may be formed with integral reinforcing ribs 56 for engagement with the metal plate 57 of a third backup rigid endless conveyor, which will travel in the same common plane as the belt 55. The backup conveyor like the conveyors 22, 23 is composed of a plurality of pivotally interconnected serially arranged plates 57 and rollers 58 engaging stationary guide tracks 59 to exert a clamping pressure within the molding zone, particularly as sealing surfaces 62.

Figure 6:
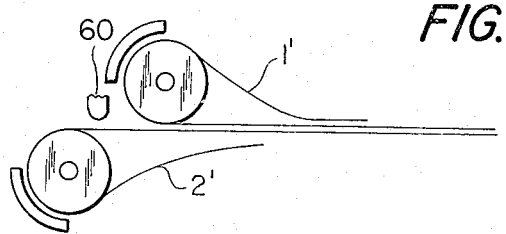
FIG. 6 is a partial schematic view of a modified arrangement for the material feeding apparatus, in elevation.

Instead of injecting the foamable material between the belts as shown in FIG. 1, it may be applied by means of a nozzle or the like 60 as shown in the embodiment of FIG. 6, wherein the belts 1' and 2' are non-equal in useable length so that the belt 2' will present an open horizontal projected surface over which to deposit the foamable material. It is understood that otherwise the structure of FIG. 6 will be identical to that previously described, although it has not been shown in detail in FIG. 6.

Thus, the synthetic resin liquid or powder, plural component or single, to be expanded within the molding zone may be applied by injection between the belts, by spraying over the projected surface of the non-equal belt arrangement, or by application as a froth coat, or by any other known means of deposition including electrostatic and electrolytic. Preferably, the resin is a foamable polyurethane which may be foamed by any known means, although it is contemplated that other materials may be used with the present invention.

While the foregoing preferred embodiment with variations has been described in detail for the specific advantages of the detail and for purposes of illustration, further variations, embodiments and modifications are contemplated within the spirit and scope of the present invention as defined by the following claims.

What is claimed is:

1. Apparatus for continuously producing a rigid foam synthetic resin product of three dimensionally configured uniform cross section throughout its indefinite length, comprising: at least two substantially opposed highly flexible endless belts having a relaxed cross sectional configuration, transverse to the belts, that corresponds to the three dimensionally configured surface to be formed on the product; means guiding said belts for travel in respective desired endless paths lying generally in a common plane, with opposed generally rectilinear molding runs closely adjacent each other forming therebetween a molding tunnel, with return runs, and with transitional curved protions between said runs for each belt; said belts being of a material sufficiently resilient to bend without permanent deformation toward a planar configuration when traversing said transitional curved portions; support means including a rigid endless backup coveyor for each of said belts traveling in an endless path generally within the path of its respective belt and generally in said common plane; each of said rigid endless backup conveyors comprising a plurality of plates serially connected together by hinge means in an endless chain traveling in a path having a generally rectilinear belt backup run closely adjacent and parallel its respective belt molding run, a return run, and opposite end transitional curved runs spaced considerably from said belt transitional curved portions; each of said rigid endless backup conveyors having a plurality of metal blocks respectively corresponding in number to and integrally secured to the surface of said plates facing said its associated belt; each of said blocks being of identical cross section transverse to the conveyor length, and being of a width substantially equal to the corresponding width of said plates; the adjacent plates of at least one of said rigid endless conveyors being pivotally connected together for substantial limited lost motion transverse to said common plane; said resilient belt associated with said one conveyor, at one side generally overlaping the adjacent belt and movable into abutting engagement with each other in one transverse direction when moved parallel to the pivoting connection of the adjacent plates in the molding zone, and at the other side having sliding engagement with the adjacent belt in the same transverse direction; backup guide means for moving said rigid endless conveyors toward each other with a predetermined spacing between the opposed plates of said rigid endless conveyors at the entrance of said molding zone and maintaining said spacing throughout the length of said molding zone; and said backup guide means further shifting successive plates of said one conveyor in said transverse direction downstream from said entrance for a substantial transverse distance to tightly clamp the adjacent abutting belt surfaces at said one side and to provide wiping sliding contact for the belt sliding surfaces at said other side, and further maintaining said shifted position throughout the remaining portion of said molding zone.

2. The apparatus of claim 1, wherein said backup guide means successively shift said plates of said one rigid conveyor in the transverse direction opposite to said one transverse direction at the exit of said molding zone for unclamping the abutting belt surfaces.

3. The apparatus of claim 2, including a third highly resilient endless belt and a third rigid endless backup conveyor within said third endless belt, each lying within a common plane generally perpendicular to said first mentioned common plane and forming one side of the mold cavity within said molding zone.

4. The apparatus of claim 1, including a third highly resilient endless belt and a third rigid endless backup conveyor within said third endless belt, each lying within a common plane generally perpendicular to said first mentioned common plane and forming one side of the mold cavity within said molding zone.

5. The apparatus of claim 1, wherein each of said configured metal blocks has a continuous three dimensional configuration support surface facing away from its respective plate conforming generally to the three dimensional configuration of the inside surface of the respective one of said belts and supportingly engaging the inside surface of the respective one of said belts generally continuously across its width within the molding zone; said blocks having a length, in the conveyor direction, generally equal to the corresponding length of said plates and extending closely adjacent each other with their outer surfaces closely adjacent within said molding zone; said continuous support surface of each of said blocks being spaced at widely varying distances from its associated plate, and each of said blocks further having a plurality of ribs extending in the conveying direction for the full length of the block integral with said outer support surface at one end and engaging the respective plate at the opposite end.

6. The apparatus of claim 5, wherein each of said metal blocks has a constant cross section, as seen in a plane perpendicular to the conveying direction, throughout its entire length with an outer wall of generally uniform thickness forming said support surface in one piece with said ribs, which ribs are of generally uniform thickness substantially equal to the thickness of said outer wall.

* * * * *